March 10, 1970  R. A. DUBUC  3,499,211

METAL INLAY AND METHOD FOR MAKING THE SAME

Filed Feb. 9, 1967

Inventor,
Rene A. Dubuc,
by James P. McAndrew
Att'y.

United States Patent Office 3,499,211
Patented Mar. 10, 1970

3,499,211
METAL INLAY AND METHOD FOR
MAKING THE SAME
Rene A. Dubuc, Attleboro, Mass., assignor to Texas Instruments Incorporated, Dallas, Tex., a corporation of Delaware
Filed Feb. 9, 1967, Ser. No. 614,985
Int. Cl. B23k 31/02
U.S. Cl. 29—480                                    7 Claims

ABSTRACT OF THE DISCLOSURE

A metal inlay of precisely controlled dimensions is formed by seam welding a first metal tape to a second relatively wider metal tape and by subsequently roll squeezing the composite seam welded tape with substantial reduction of the thickness thereof for embedding the first tape into the second tape and for further bonding the first tape to the second tape.

BACKGROUND OF THE INVENTION

Precious metal inlays are conventionally formed as stripes of inlaid material in relatively long strips of base metal and are then cut laterally of the strip to form small electrical contact members. In these contact members, the inlay stripe portion thereof serves as an electrical contact surface and is supported by the base metal portion of the member.

In the conventional process for making such metal inlays, a relatively gross billet of malleable base metal is grooved by conventional machining techniques and a thin layer of solder is placed within the groove. Frequently a metallic groove interliner material is also laid in the groove on top of the solder layer and a second layer of solder is sometimes formed on top of the interliner. The desired malleable precious metal inlay is then placed in the billet groove and is brazed within the groove by the application of suitable heat and pressure. The gross billet with its brazed inlay of precious metal is then repeatedly rolled for substantially reducing the billet thickness to form a metal base tape having the desired precious metal stripe inlaid therein.

Because the brazing step in the described prior art process restricts the billet length, economy of manufacture requires use of the relatively gross billet and subsequent substantial reduction of the billet thickness in order to form a suitably long length of the desired striped tape. However the gross nature of the billet and the extensive billet reduction required in forming the tape makes it difficult to control the thickness and location of the precious metal stripe in the base metal tape. As a result, in order to assume that the tape can be cut to form electrical contact members with at least the required minimum contact portion dimensions, precious metal inlays are customarily formed with a precious metal stripe substantially wider and much thicker than the minimum desired contact dimensions to allow for the necessary manufacturing tolerances. Typically, the precious metal inlay strip is made .016 to .032 inch wider and as much as 50% thicker than the minimum dimensions desired in the contact portion of a contact member to be made from the inlaid tape. As will be understood, this requires use of an excessive amount of precious metal and significantly increases the cost of the ultimate contact members.

SUMMARY OF THE INVENTION

In accordance with this invention, commercially available, malleable, weldable metal tapes clad with the desired precious metals are seam welded to a malleable, weldable base metal tape to form a composite tape. In this seam welding step, precise location of the precious metal clad tape on the base metal tape is easily accomplished. In addition, the dimensions of the precious metal clad tape more nearly approximate the ultimate dimensions of the desired metal inlay. The seam welded composite tape is then subjected to roll squeezing for embedding the precious metal clad tape in the base metal tape and for reducing the composite tape to the desired dimensions. Desirably, the roll squeezing step is preceded by cleaning and annealing of the composite seam welded tape and the roll squeezing is conducted in a reducing or other controlled atmosphere where required so that the roll squeezing results in improvement of the bond between the precious metal clad tape and the base metal tape.

The product resulting from this process is the desired stripped metal inlay tape in which the dimensions of the metal stripe inlay are very precisely controlled. Because these dimensions are so well controlled, the precious metal inlay portion of the tape is made much smaller than in prior art stripped tapes with complete assurance that the tape can be usel for making electrical contact members with precious metal contact portions of the desired minimum dimensions.

The ease of manufacture using relatively inexpensive, commercially available tapes, and the saving of precious metal made possible by the method of the invention thus permit the manufacture of electrical contact members at significantly lower cost.

DESCRIPTION OF THE PREFERRED EMBODIMENTS

Figure 1:
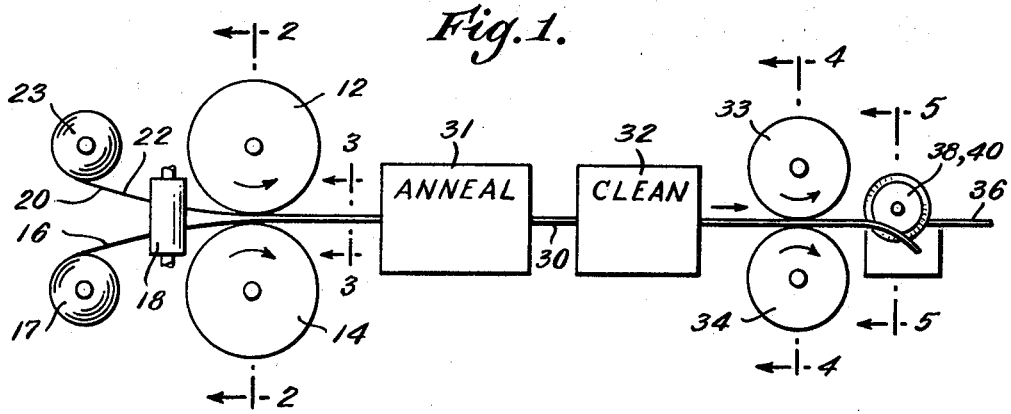
FIG. 1 is a diagrammatic side elevation view of apparatus employed in carrying out the method of this invention.
Figure 2:
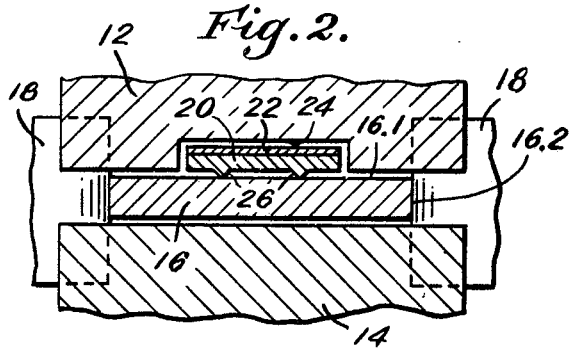
FIG. 2 is a partial section view to enlarged scale along line 2—2 of FIG. 1.

Referring to the drawings, 12 and 14 in FIG. 1 indicate the rolls of a conventional seam welding machine. As this seam welder is completely conventional it is not further described herein but it will be understood that the seam welder is capable of forming the hereinafter described seam welds in conventional manner. In accordance with this invention, a malleable weldable base metal strip or tape 16 is continuously fed between the welder rolls 12 and 14 from a reel 17 as guided by guide roll means 18. At the same time, a relatively narrower, malleable weldable metal strip or tape 20, preferably clad on one side as shown with a selected precious metal 22 or the like, is also continuously fed from a reel 23 between the rolls 12 and 14 as guided by the groove 24 in the seam welder roll 12. See FIG. 2. The groove 24 aligns the tape 20 on the relatively wider surface 16.1 of the tape 16 at a selected location spaced inwardly from the edge 16.2 of the tape 16 as shown in FIG. 2.

For example, in fabricating one commercially useful metal inlay tape, the base metal tape 16 comprises a brass tape (85% copper—15% zinc) 1 inch wide and .0315 inch thick. The tape 20 comprises a cupronickel tape (70% copper—30% nickel) having a cladding 22 of gold alloy (75% gold—25% silver) bonded to the tape 20 by liquid or solid phase bonding or the like in any conventional manner. Of course the described metal tapes can also be formed of silver, copper, steel or other malleable, weldable metals or metal alloys within the scope of this invention, and the inlay tape cladding 22 can be omitted where desired. The tape 20 and its cladding 22 are preferably .740 inch wide, the cladding 22 having a thickness of .0015 inch and the tape 20 having a thickness, including the welding projections 26, of .0095 inch. The welding projections 26 preferably extend the full length of the tape 20, have an included angle of approximately 120°, and extend outwardly from the body of the tape 20 approximately .0035 inch. The groove 24 in the seam welder roll 12 is preferably .00744 inch wide and has a depth of approximately .004 inch for aligning the tape 20 at a spacing of .500 inch from the edge 16.1 of the relatively wider base metal tape 16. For clarity of illustration, the rolls 12 and 14 are shown spaced from the tapes 16 and 20 in FIG. 2 but it will be understood that the rolls contact the tapes to press a surface of the tape 20, opposite its cladding 22, firmly against the surface 16.1 of the tape 16. Preferably the rolls 12 and 14 have a diameter of 6 inches and squeeze the tapes together with a force of approximately 75 pounds. In a desirable embodiment of this invention, the rolls 12 and 14 direct a current of about 8000 amperes through the tapes for periods of 1/30 of a second at intervals of 1/30 of a second and heat the tapes at the location of the welding projections 26 to a temperature of approximately 2100° F. for welding tape 20 to tape 16. The tapes 16 and 20 are preferably fed between the rolls 12 and 14 at a rate of 48 inches per minute.

Figure 3:
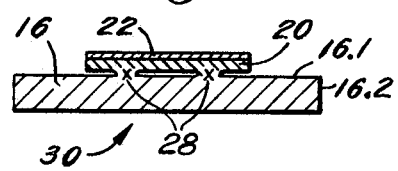
FIG. 3 is a partial section view to enlarged scale along line 3—3 of FIG. 1.

In this way, the tape 20 with its precious metal cladding 22 is securely seam welded to the base metal tape 16 as indicated at 28 in FIG. 3 and the location of the tape 20 is precisely controlled with respect to the base metal tape to form the composite tape or strip 30.

This composite seam welded tape 30 is then, preferably but not necessarily, annealed in a conventional manner as is diagrammatically indicated at 31 in FIG. 1. Preferably where the specific tape materials are employed as above described, the composite tape 30 is annealed for 2 minutes at 1100° F. in a reducing atmosphere to prevent the formation of bond-preventing oxide films on the facing surfaces of the tapes 16 and 20. However, where other tape materials are used, annealing may be performed in other controlled atmospheres as will be understood. If desired, the composite tape 30 is cleaned in any conventional manner as is diagrammatically indicated at 32 in FIG. 1. For example, where the specific tape materials are employed as above described, the composite tape is cleaned by immersing the tape in a conventional pickling bath of dilute sulfuric acid followed by heating the tape for 2 minutes of a temperature of 800° F. for removing any tape surface films resulting from the bath.

Figure 4:
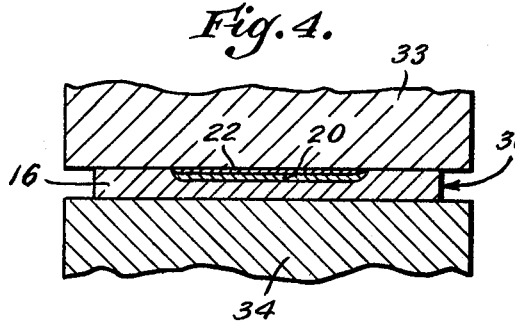
FIG. 4 is a partial section view to enlarged scale along line 4—4 of FIG. 1.
Figure 5:
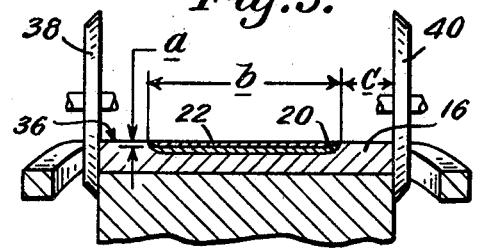
FIG. 5 is a partial section view to enlarged scale along line 5—5 of FIG. 1.

In accordance with this invention, the composite seam welded tape 30 is then continuously fed between the rolls 33 and 34 of a conventional roll squeezing mill for embedding the tape 20 and its cladding 22 in the base metal tape 16 so that the cladding 22 is flush with the base metal tape surface 16.1. This embedding is accompanied by a substantial reduction of the thickness of the tapes 16 and 20 and of the cladding 22. In addition, the tape 20 is solid-phase bonded to the base metal tape 16 over at least part of the facing tape surfaces as a result of the roll squeezing of the composite tape. In order to facilitate this solid-phase bonding, the roll squeezing of the composite tape is preferably carried out in a controlled atmosphere where required. If desired, the roll squeezed composite tape or member, indicated at 36 in FIG. 4, is also sintered in conventional manner for further improving the solid-phase bonds between the tapes 16 and 20.

For example, where the tape materials specifically described above are employed, the rolls 33 and 34 are preferably 6 inches in diameter and are squeezed together with a force of 400 pounds or more for reducing the composite tape 30 to form the inlay tape 36 with a thickness of .007 inch, a width of 1.040 inch and a consequent elongation of the tape of approximately 4.4 to 1. In this approximately 80% reduction, the tape 20 and its cladding 22 uniformly increase in width to .076±.005 inch and are uniformly reduced in thickness, the tape 20 to a thickness of .0013 inch and the cladding 22 to a thickness of .0003 inch. Where this roll squeezing is performed in a reducing atmosphere of hydrogen gas or the like, the tape 20 and its cladding 22 are bonded to the base metal tape 16 over substantially the entire facing surfaces of the tapes to form the desired striped inlay 36. As will be understood, the tape 20 serves as an interliner for the precious metal inlay 22 substantially preventing diffusion of the precious metal into the base metal tape 16.

In accordance with this invention the inlay tape 36 is fed between conventional slitting roll cutters 38 and 40 where the inlay tape is cut to the desired width in conventional manner. Because of the way in which the inlay tape has been formed as above described, the thickness $a$ and the width $b$ of the precious metal stripe inlay 22 and the spacing $c$ of the stripe from the slit edge of the tape are very precisely controlled. For example, where the specific tape materials are employed as above-described, the stripe width $b$ and spacing $c$ from the tape edge are precisely controlled within a tolerance of ±.005 inch. The thickness $a$ of the precious metal inlay 22 is precisely controlled within a tolerance of ±.0001 inch, a thickness tolerance of less than 35% even in an inlay stripe of very thin character. Such a tape 36 embodies significantly less precious metal than comparable prior art striped tapes capable of forming electrical contact member of the same minimum contact dimensions. Thus the tape 36 is useful in making electrical contact members at significantly lower cost than prior art striped metal inlay tapes.

It should be understood that although the seam welding, annealing, cleaning, roll squeezing and slitting steps are illustrated as being performed in a continuous process, these process steps can be performed separately within the scope of this invention.

Although particular embodiments of this invention have been described above by way of illustration, it should be understood that this invention includes all modifications and equivalents thereof falling within the scope of the appended claims.

I claim:

1. The method of forming a substantial length of metal stripe inlay of precisely controlled width and thickness in a base metal member wherein an edge of the inlay stripe extends along an edge of said base metal member at a precisely controlled distance from said base member edge, said method comprising the steps of seam welding a surface of a substantial length of a first strip of malleable, weldable stripe metal of selected width and thickness in a selected location extending along a relatively wider surface of a substantial length of a second strip of a malleable, weldable base metal to form a composite strip, said first strip being welded to said second strip with an edge of said first strip extending along an edge of said second strip and spaced a predetermined distance from said second strip edge, and roll squeezing said composite strip for embedding said first metal strip into said second metal strip to form a base metal member having a metal stripe inlay of precisely controlled width and thickness wherein an edge of said stripe extends along an edge of said base metal member at a precisely controlled distance from said base member edge.

2. The method as set forth in claim 1 wherein said first metal strip has a metal cladding of selected thickness on at least one side thereof and is seam welded oppositely of said one cladding side to said second metal strip surface to form said composite strip, and wherein said composite strip is roll squeezed with substantial reduction of the thickness thereof for embedding said clad strip into said second strip with said strip cladding flush with said second strip surface so that said strip cladding forms said metal stripe inlay.

3. A method as set forth in claim 1 wherein said first and second metal strips comprise metal tapes of substantial length, said first strip tape is seam welded to said second strip tape progressively from one end of said strip to the opposite end thereof to form a composite metal strip tape of substantial length, and said composite metal strip tape is continuously roll squeezed with substantial reduction of the thickness thereof as it is formed for embedding said first strip tape into said second strip tape to form a base member of substantial length having said metal inlay extending along the length thereof.

4. A method as set forth in claim 1 wherein said composite strip is annealed and cleaned after said welding of said first and second strip and before said roll squeezing of said composite strip and wherein said composite strip is roll squeezed in a selected atmosphere for embedding said first metal strip into said second metal strip and further bonding said first strip to said second strip to form said base member having said metal inlay.

5. The method as set forth in claim 2 wherein said first metal strip embodies a cupronickel alloy having a gold alloy cladding on one side thereof and said second metal strip embodies brass to form said composite strip.

6. The method as set forth in claim 5 wherein said composite strip is annealed and cleaned before roll squeezing thereof, and wherein said composite strip is roll squeezed with approximately 80% reduction of the thickness thereof in a reducing atmosphere for embedding said first metal strip into said second metal strip and for further bonding said first metal strip to said second metal strip to form said base member having said metal inlay.

7. The method as set forth in claim 1 wherein said base metal strip is trimmed along said edge thereof subsequent to said roll bonding for spacing said base metal edge at a precisely controlled distance from said edge of said stripe metal strip.

References Cited

UNITED STATES PATENTS

| | | | |
|---|---|---|---|
| 2,961,762 | 11/1960 | Clark et al. | 29—497 X |
| 3,000,092 | 9/1961 | Scuro | 29—497 X |
| 3,128,649 | 4/1964 | Avila et al. | 29—497 X |
| 3,281,853 | 8/1965 | Howarth et al. | 29—475 X |
| 3,372,309 | 3/1968 | Stockdale | 29—626 X |
| 3,386,161 | 6/1968 | Ruf | 29—497 X |

JOHN F. CAMPBELL, Primary Examiner

R. B. LAZARUS, Assistant Examiner

U.S. Cl. X.R.

29—497.5